UNITED STATES PATENT OFFICE.

A. ATWOOD OLIVER, OF BROOKLYN, ASSIGNOR OF ONE-FOURTH TO AMELIA F. SCOTT, OF NEW YORK, N. Y.

COMPOSITION OF MATTER FOR ROOFING, FURNITURE, &c.

SPECIFICATION forming part of Letters Patent No. 334,974, dated January 26, 1886.

Application filed October 3, 1885. Serial No. 178,871. (No specimens.)

*To all whom it may concern:*

Be it known that I, A. ATWOOD OLIVER, of the city of Brooklyn, in the county of Kings and State of New York, have invented a new and Improved Composition of Matters, of which the following is a specification.

The object of my invention is to provide a composition which may be used with advantage as a substitute for wood and for other compositions which have been shaped by molding or pressing them while in a plastic or semi-plastic state, and which shall be inexpensive, strong and light, water-proof and fire-proof, and not subject to change of form or condition by atmospheric influences.

To these ends my invention is a composition which consists, in its essential elements, of Manila or other fibrous stock, asbestine powder, oil, and tungstate of soda. The oil which I prefer to use is a mixture of linseed-oil and oil of tar, and where the composition is to be made into boards or sheets for roofing and other purposes where it is exposed to the weather I prefer to employ ground emery as an element of the composition.

In carrying out my invention for various purposes it may be desirable to use different proportions of the several elements of which my composition is composed, and hence I do not wish to be restricted to any exact proportions of the several ingredients.

I have found that a composition which will embody the advantages of my invention may be made with the following proportions of ingredients: Manila or other fibrous stock, one thousand pounds; asbestine powder, one thousand pounds; linseed-oil, one hundred and seventy pounds; oil of tar, one hundred and seventy pounds; tungstate of soda, ninety pounds; ground emery, fifty pounds.

In carrying out my invention I first mix the Manila or other fibrous paper-stock and the asbestine powder, and also the emery, if the latter is to be employed, thoroughly together by a beating-engine—such as is used in paper-making—until a homogeneous and fibrous stock is produced. When the composition is to be produced in sheets, plates, or boards, the fibrous stock is run out on a board-machine—such as is used in making straw-board or binders' board—and then these sheets, plates, or boards are dried thoroughly, either by sun heat or in a drying-room, until free from moisture. The dried sheets, plates, or boards are then saturated thoroughly with the liquid ingredients of the composition. To effect this the linseed-oil, which is preferably boiled, the oil of tar, and the tungstate of soda are all mixed together, and the sheets, boards, or plates are dipped or immersed therein until they are saturated through and through. This will readily be accomplished, as the fibrous stock, being thoroughly dry, will take up or absorb its full complement of the oil and soda. After the sheets, plates, or boards are thoroughly saturated or impregnated with the oily matter, they are baked or "cured" for a period of four or five days at a temperature of about four hundred degrees (400°) Fahrenheit, and are then completely finished and ready for the various uses to which they may be placed.

In making of the composition articles, which are to be molded or pressed into shape by dies or molds, the fibrous stock composed of Manila or other fibrous material and asbestine powder is first thoroughly dried by natural or artificial heat to free it entirely from moisture, and is then mixed in a beating-engine or otherwise with the oils and tungstate of soda until a homogeneous mass is produced. This mass while in a semi-plastic state may be molded or pressed with dies into any desired ornamental shapes, and the articles are then to be baked or cured for about four or five days at a temperature of about four hundred degrees (400°) Fahrenheit.

The articles produced from my composition as above described may have any desired color given them by mixing coloring-matter with the composition before it is dried, and the material is susceptible of a very high polish.

My composition, when produced in the form of sheets, plates, or boards, may be used for roofing and covering buildings externally, for ceilings, walls, and other interior decoration, or finishing of buildings, railway-cars, and other structures, for furniture, and for a great variety of useful purposes, as a substitute for sheets or boards of wood.

The composition may be molded or pressed to produce all kinds of ornaments for furniture and for interior decoration—as for walls and ceilings and other decorative purpose— and such articles may either be molded solid or in the form of thin shells, which may be filled or backed with other materials. The composition may also be molded or pressed into shape to form concave or hollow vessels for any purpose desired.

When employed in any of the ways above described, the composition has many advantages over wood and other compositions heretofore used for analogous purposes. It is very tough, strong, and hard, light, water-proof, acid-proof, and fire-proof. It contains no glue, starch, or other substances which can be affected by the varying conditions of the atmosphere, and articles may be produced from it at a very low cost, considering the advantages which it possesses.

What I claim as my invention, and desire to secure by Letters Patent, is—

1. The composition consisting, in its essential elements, of fibrous stock, asbestine powder, oil, and tungstate of soda, combined substantially as and for the purpose herein described.

2. The composition consisting, in its essential elements, of fibrous stock, asbestine powder, linseed-oil, oil of tar, and tungstate of soda, combined substantially as and for the purpose herein described.

3. The composition consisting, in its essential elements, of fibrous stock, asbestine powder, oil, tungstate of soda, and emery, combined substantially as and for the purpose herein described.

A. ATWOOD OLIVER.

Witnesses:
C. HALL,
FREDK. HAYNES.